Figure 1:
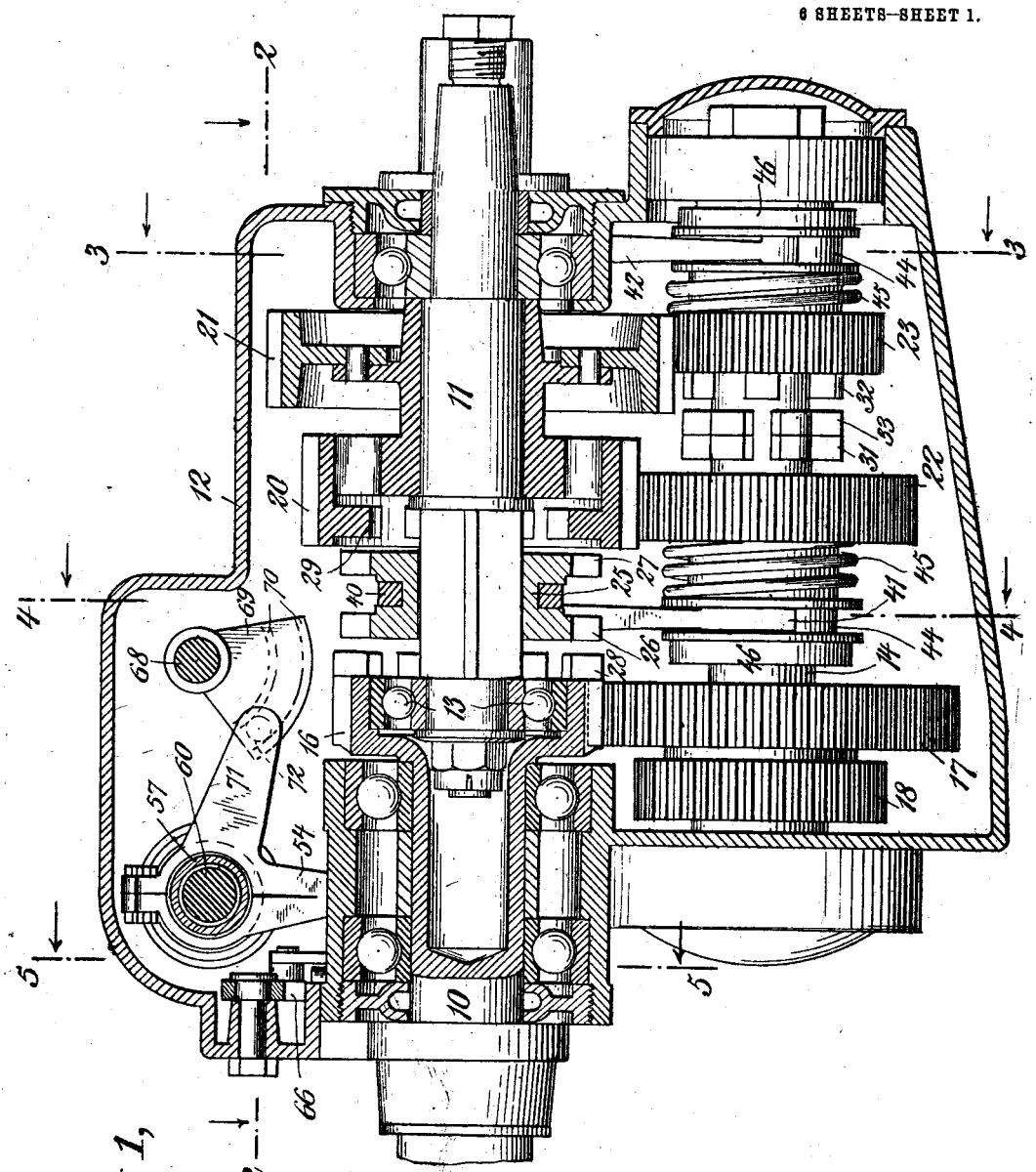

C. W. PARKER.
TRANSMISSION GEARING.
APPLICATION FILED OCT. 8, 1910. RENEWED SEPT. 20, 1912.

1,103,683.

Patented July 14, 1914.

6 SHEETS—SHEET 1.

WITNESSES:

INVENTOR

C. W. PARKER.
TRANSMISSION GEARING.
APPLICATION FILED OCT. 8, 1910. RENEWED SEPT. 20, 1912.

1,103,683.

Patented July 14, 1914.

6 SHEETS—SHEET 2.

WITNESSES:

INVENTOR

C. W. PARKER.
TRANSMISSION GEARING.
APPLICATION FILED OCT. 8, 1910. RENEWED SEPT. 20, 1912.

1,103,683.

Patented July 14, 1914.
6 SHEETS—SHEET 3.

WITNESSES:

INVENTOR

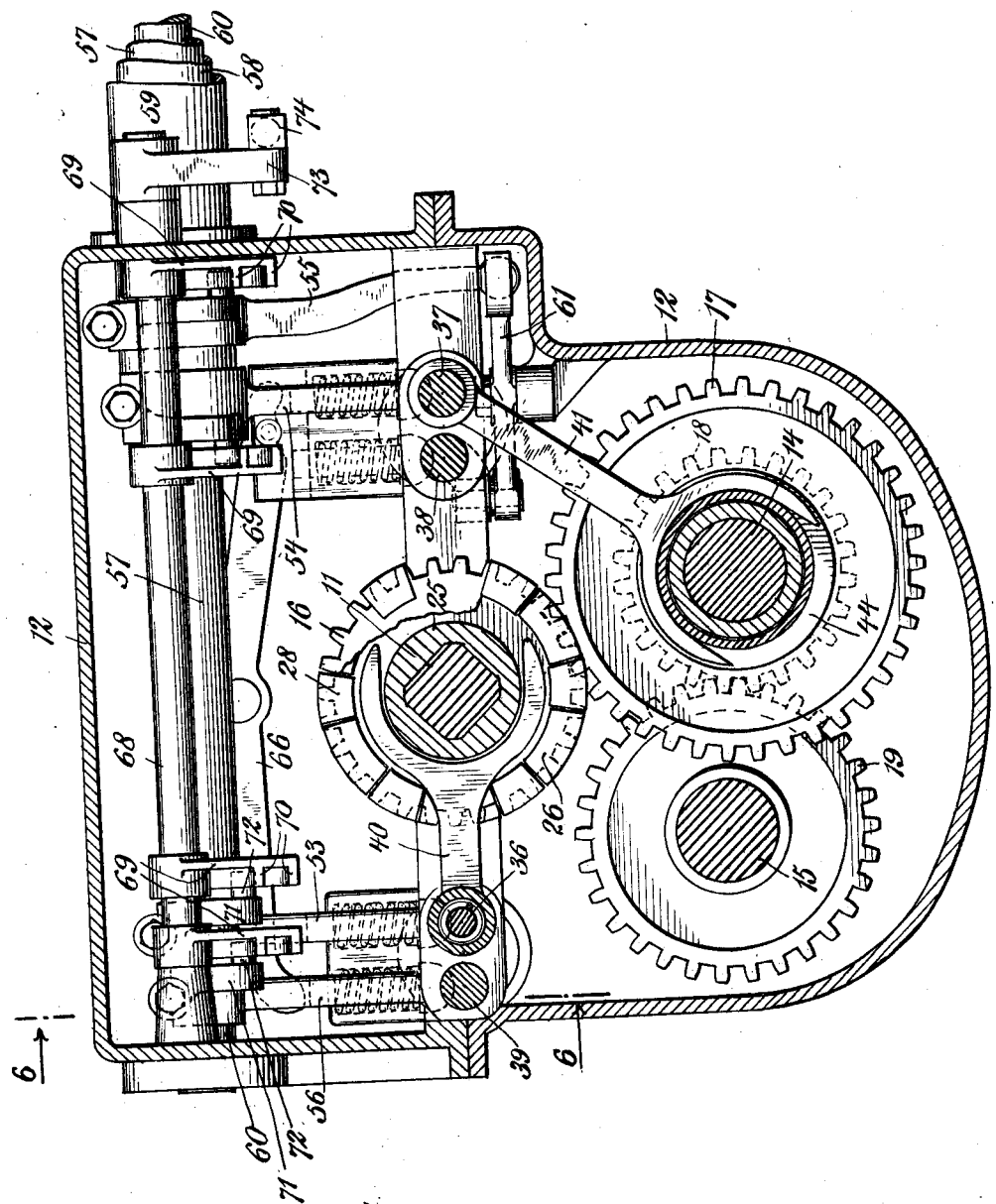

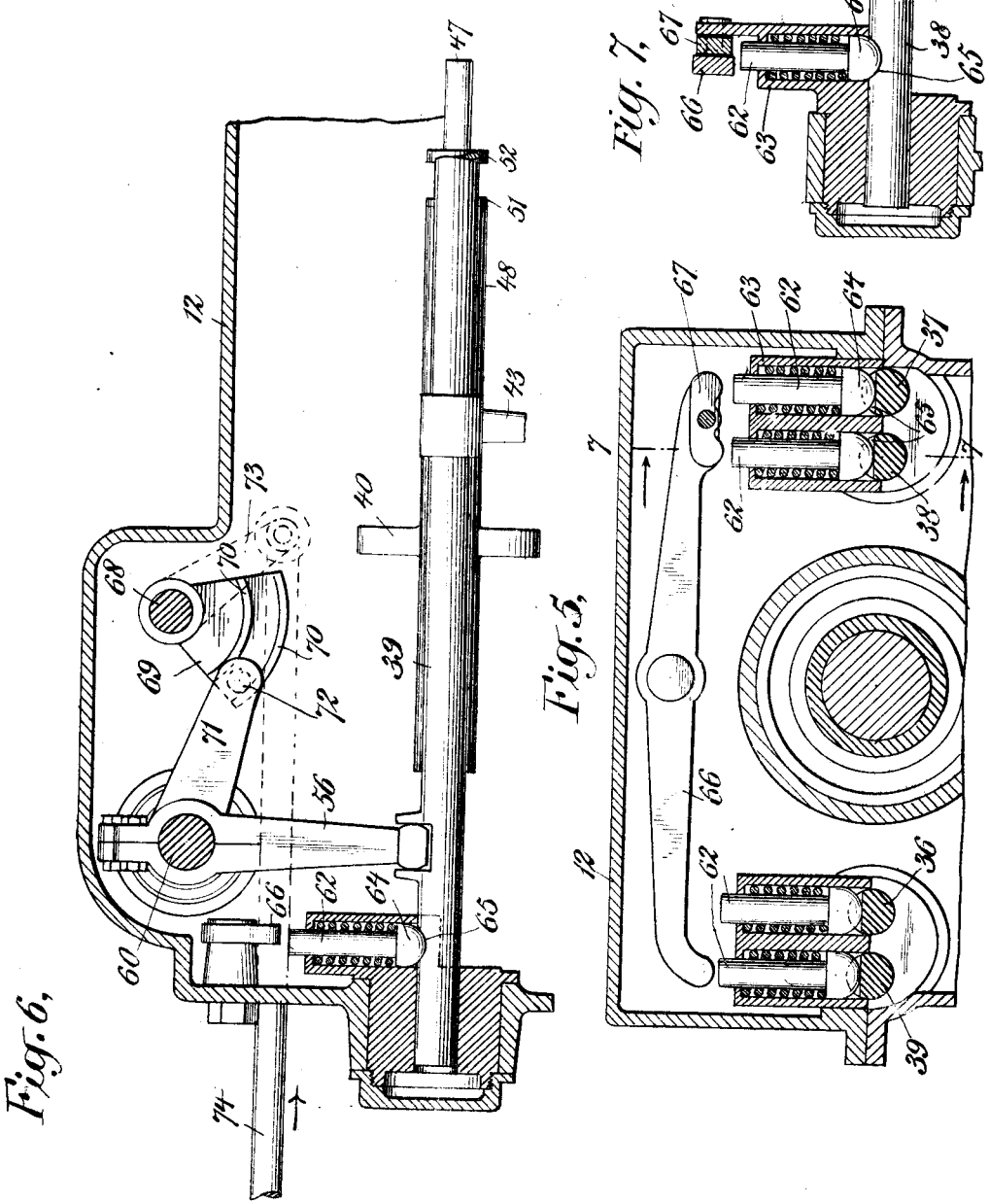

C. W. PARKER.
TRANSMISSION GEARING.
APPLICATION FILED OCT. 8, 1910. RENEWED SEPT. 20, 1912.

1,103,683.

Patented July 14, 1914.
6 SHEETS—SHEET 6.

WITNESSES:

INVENTOR
Clark W. Parker

UNITED STATES PATENT OFFICE.

CLARK W. PARKER, OF SPRINGFIELD, MASSACHUSETTS, ASSIGNOR TO LOUIS W. EMERICK, OF FULTON, NEW YORK, RECEIVER OF PARKER TRANSMISSION AND APPLIANCE COMPANY, BANKRUPT.

TRANSMISSION-GEARING.

1,103,683.  Specification of Letters Patent.  Patented July 14, 1914.

Application filed October 8, 1910, Serial No. 585,916. Renewed September 20, 1912. Serial No. 721,514.

*To all whom it may concern:*

Be it known that I, CLARK W. PARKER, a citizen of the United States of America, and a resident of Springfield, county of Hampden, and State of Massachusetts, have invented certain new and useful Improvements in Transmission-Gearing, of which the following is a specification, reference being had to the accompanying drawings, forming a part thereof.

My invention relates to improvements in transmission gearing, and particularly to the class of transmission gearing of the type employed for transmitting driving movements at variable speeds and in different directions from the driving to the driven elements of motor vehicles, machine tools, and other mechanism.

My invention relates specifically to that type of transmission gearing of this character in which positive jaw clutches are employed for bringing about the changes of driving relation as distinguished from that type in which the gear wheels slide longitudinally into and out of mesh with each other as is very commonly in use at the present day, the former having great advantages in strength and positiveness of operation over the latter style.

The main objects of my invention are, first, to reduce the size of the gearing as a whole, and particularly to reduce the length of the shafts employed when considered in relation to the number of such shafts and while arranging for four different driving relations; second, to provide such interlocking mechanism as will cause all of the clutch means not being operated at any one time to be locked during the time the other clutch mechanism is being operated; third, to improve and simplify the clutch operating means; and fourth, to improve generally the form and construction of the parts and the means by which they are operated, all as will appear more fully hereinafter.

To the foregoing ends my invention consists in many novel details of construction and combinations of parts such as will be fully pointed out in the following specification, and in order that my invention may be thoroughly understood, I will now proceed to describe an embodiment thereof having reference to the accompanying drawings illustrating the same, and then point out the novel features in claims.

Figure 2:
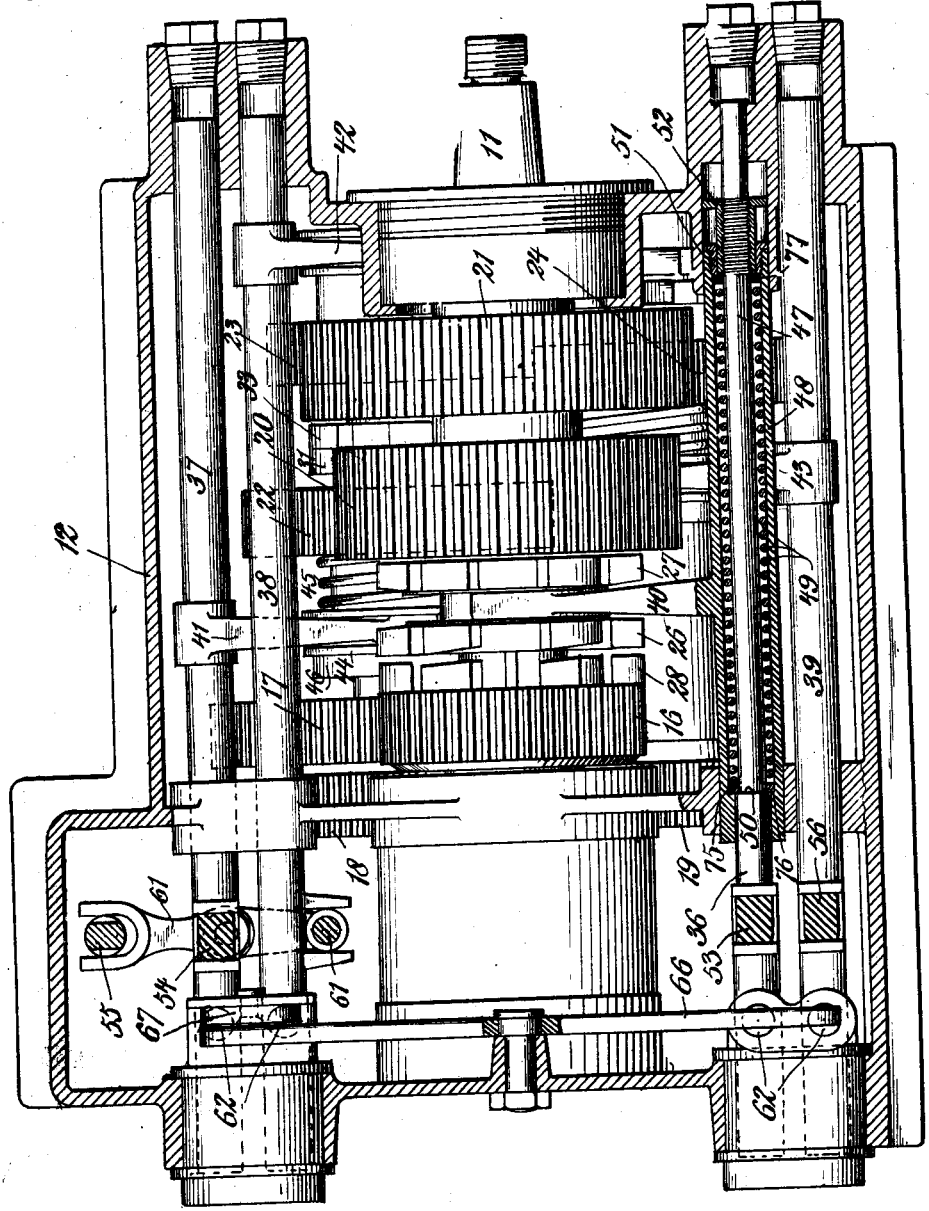
Figure 3:
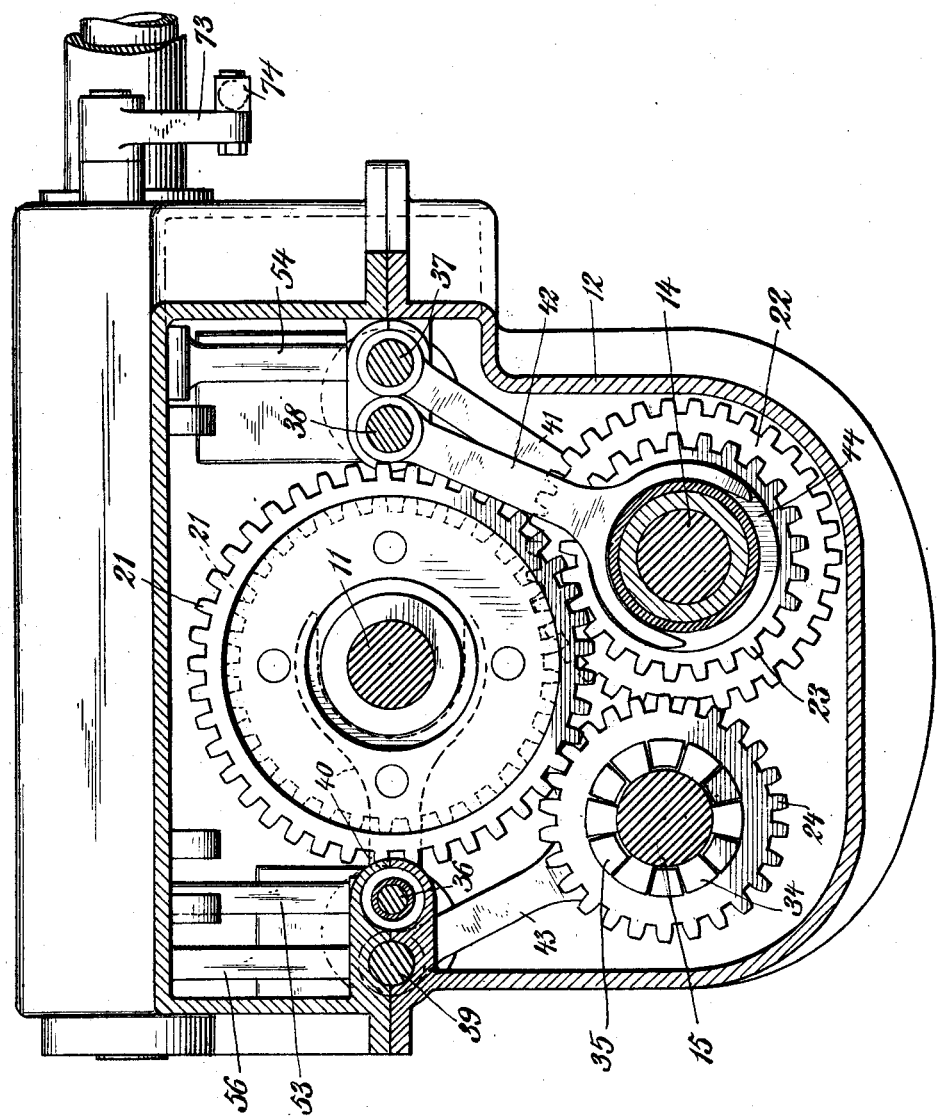
Figure 8:
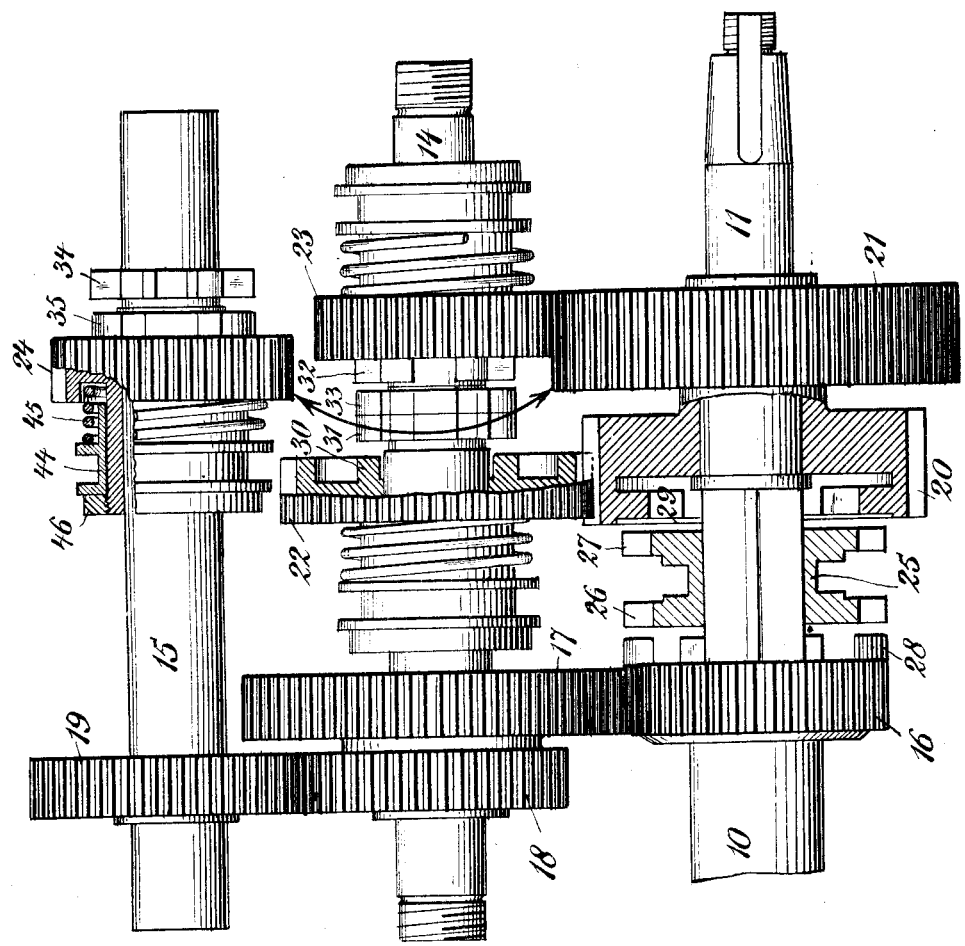

In the drawings: Figure 1 is a view in central vertical longitudinal section through a transmission gearing constructed in accordance with my invention. Fig. 2 is a view in horizontal section thereof upon the plane of the line 2—2 of Fig. 1. Fig. 3 is a transverse sectional view thereof upon the plane of the line 3—3 of Fig. 1. Fig. 4 is a transverse sectional view of the same upon the plane of the line 4—4 of Fig. 1. Fig. 5 is a detail transverse sectional view upon the plane of the line 5—5 of Fig. 1. Fig. 6 is a detail view in vertical longitudinal section upon the plane of the line 6—6 of Fig. 4. Fig. 7 is a detail view in longitudinal vertical section upon the line 7—7 of Fig. 5. Fig. 8 is a view in development of the transmission gearing generally, the several shafts being swung around into a single plane in order to illustrate in one view the relationship of the various gear wheels with respect to each other.

The driving and driven shafts 10—11 are arranged longitudinally in line with each other as is common, both of the said shafts being journaled in suitable bearings in a casing 12, the driven shaft 11 being provided in addition, at the forward end thereof, with a bearing 13 carried at the adjacent rearward end of the driving shaft 10 (see particularly Fig. 1). Mounted parallel with the shafts 10 and 11 are two other shafts 14 and 15, the former of which I term herein the "intermediate shaft," and the latter, the "reversing shaft." These two shafts are likewise journaled in suitable bearings in the casing 12, and lines connecting their axes form a triangle as will be readily understood by reference to the transverse sectional views of Figs. 3 and 4. Mounted fast upon the drive shaft is a pinion 16, the teeth of which are in mesh with the teeth of a spur gear 17 mounted fast upon the intermediate shaft 14. Secured fast to the intermediate shaft 14, alongside the spur gear 17, is a pinion 18 the teeth of which are in engagement with the teeth of a complementary gear wheel 19 secured fast upon the reversing shaft 15. As all the above mentioned gear wheels are secured fast upon their respective shafts it follows that the drive shaft, the intermediate shaft, and the reversing shaft will rotate constantly, the intermediate shaft at a lower rate of speed and in a reverse direction to that of the drive shaft, and the reversing shaft at a still lower rate of speed but in the same direction as that of the drive shaft.

In addition to the above mentioned gear wheels the following gear wheels are mounted loosely upon their respective shafts. Upon the driven shaft there are two gear wheels 20—21. These two gear wheels are secured fast together but they rotate freely upon the driven shaft 11. The teeth of these gears are disposed in mesh with the teeth of complementary gear wheels 22—23 loosely and independently mounted upon the intermediate shaft 14. The teeth of the gear wheel 21 are also arranged in mesh with a complementary gear wheel 24 loosely mounted upon the reversing shaft 15. The various loosely mounted gear wheels are arranged to be connected with their respective shafts by suitable clutch mechanism, and a clutch mechanism is also provided for connecting the driving and driven shafts directly together, all of which I will now describe.

Mounted in sliding relation upon the driven shaft 11, but connected to rotate therewith, is a collar 25 carrying two jaw clutch elements 26—27. The jaw clutch element 26 is arranged to coengage with teeth or jaws 28 upon the gear wheel 16, while the clutch element 27 is arranged for co-engagement with teeth or jaws 29 upon the gear wheel 20. When the collar is moved to the left (as viewed in Figs. 1 and 8) the clutch element 26 will co-engage with the teeth or jaws 28, and so by connecting the gear wheel 16 upon the shaft 10 with the shaft 11, will directly connect the driving and driven shafts together. If, on the other hand, the collar 25 be shifted to the right (as viewed in Figs. 1 and 8) then the gear wheel 20 will be connected with the driven shaft 11. In order that driving movements be imparted, however, to either of the gear wheels 20—21, it will be necessary to connect either one of the gear wheels 22 or 23 with the intermediate shaft 14, the latter it will be remembered constantly rotating by reason of its connection through the gear wheels 16 and 17 with the drive shaft. Either of these gear wheels may be connected with the shaft 14 by sliding them longitudinally upon the shaft in the proper direction. The gear wheel 22 must be moved to the right (as viewed in Fig. 8), the effect whereof will be to cause the co-engagement of jaw clutch teeth 30 carried by the said gear wheel 22, with complementary jaw clutch teeth 31 carried by the shaft 14. Similarly, the movement of the gear wheel 23 to the left (as viewed in Fig. 8) will cause the co-engagement of jaw clutch teeth 32 carried by the said gear wheel 23, with complementary jaw clutch teeth 33 secured to the said shaft 14. It will be noted that the teeth of the gear wheels 20—21 are of sufficient width longitudinally of the axis of rotation of the wheels to permit sufficient sliding movements of the gear wheels 22 and 23 to effect the foregoing result while retaining a proper intermeshing relation between the gear wheels 20—22 and 21—23. It will also be noticed that, as the ratios of the gear wheels 20—22 and 21—23 differ, there will be a different speed ratio and hence a different rate of speed at which the driven shaft is driven with respect to the drive shaft in accordance with the set of gears through which the driving movements are imparted. For instance, if the driving movements are imparted through the gear wheel 22 to the gear wheel 20 a greater rate of speed will result than if the driving movements were imparted through the gear wheels 23 and 21. From the foregoing it will be apparent that the highest forward speed, i. e., direct drive, will result from the movement of the collar 25 to the left, as viewed in Fig. 8, while the gear wheels 22—23 are maintained in their normal idle positions; that an intermediate rate of speed will result if the collar 25 be moved to the right, as viewed in Fig. 8, simultaneously with the movement of the gear wheel 22 to the right, while the lowest rate of speed will result if the gear wheel 23 is moved to the left, as viewed in Fig. 8, while the collar 25 is moved to the right, the gear wheel 22 remaining of course in its neutral inoperative position at such time.

To effect reverse driving movements it is necessary to connect the gear wheel 24 with the reversing shaft 15 while retaining the gear wheels 22—23 in their neutral inoperative positions upon the intermediate shaft 14 and moving the collar 25 upon the driven shaft over to the right. Driving connection will then be as follows:—from the pinion 16 upon the drive shaft 10 to the spur gear 17 upon the intermediate shaft, thence through the pinion 18 to the spur gear 19 upon the intermediate shaft, thence through the gear wheel 24 upon the reversing shaft to the gear wheel 21 upon the driven shaft. It will be noted that in Fig. 8 the gear wheel 24 is not shown in engagement with the gear wheel 21, but this is because in making the development the shaft 15 is swung around from its proper position with respect to the driven shaft 11. Actually the teeth of these two gears are always in mesh as is clearly shown in Fig. 3. As the driving and reversing shafts rotate in the same direction it will follow that intermeshing gear wheels carried by the two shafts will go in opposite directions,—hence the driven shaft will be at such times rotated in the reverse direction and at a low rate of speed. The gear wheel 24 upon the reversing shaft is secured to rotate with its shaft by a movement imparted thereto to the right (as viewed in Fig. 8), the reversing shaft being provided with teeth 34 constituting one element of a jaw clutch, the other element comprising complementary teeth 35 carried by the said gear wheel 24.

I will now describe how the above mentioned sliding movements are imparted to the several gear wheels 22—23—24 and to the collar 25 by which they are connected and disconnected with their several shafts respectively. On the horizontal plane in which the axis of the shafts 10 and 11 is contained are four shipper rods 36—37—38—39. These shipper rods are mounted in suitable housings in the casing 12 so as to slide longitudinally therein upon the said plane and parallel with the axis of the said shafts 10 and 11. The said shipper rods are respectively provided with operating forks 40—41—42 and 43, the forked ends of which are arranged in engagement with the collar 25 and the gear wheels 22—23 and 24 respectively. The fork 40 connects directly with the collar 25 while the forks 41—42—43 connect with sliding collars 44 mounted upon the hubs of their respective gear wheels, being spring actuated in one direction by helical springs 45 and limited in their movement under such spring actuation by means of collars 46 upon the extremities of the gear wheel hubs. This spring connection affords a yielding relation between the operating means and the clutches as will be well understood, and is described in further detail and claimed in a co-pending application Serial Number 536,335, filed January 1, 1910. In the case of the clutches operated by movement of the collar 25 the yielding connection is located in the shipper rod (see particularly Fig. 2). This particular shipping rod has a reduced portion 47 and a surrounding sleeve 48 longitudinally movable with respect to the main portion of the shipper rod. A helical spring 49 surrounds the reduced portion 47 within the sleeve 48, bearing at one end upon a washer 75 which rests normally against a shoulder 50 upon the main portion of the shipper rod, and against a shoulder 76 upon the said sleeve 48, and at the other end upon a washer 77 which rests normally against the end of a bushing 51 secured by a screw-threaded connection to the rear end of the sleeve and against a nut 52 secured upon the reduced portion 47 of the shipper rod. The operating fork 40 is carried by the sleeve portion 48 of the shipper rod, the helical spring 49 serving as a yielding flexible connection between the fork and sleeve and the main part of the shipper rod when the latter is moved in either direction. The fact that the rear end of the helical spring bears simultaneously against a portion carried by the sleeve as well as by a portion carried by the reduced part of the shipper rod, serves to bring the parts into a normal relative position when the fork is in a neutral position or otherwise unopposed against longitudinal movement.

The several shipper rods are engaged and operated by suitable operating arms 53—54—55 and 56 which are carried respectively by concentric sleeves 57—58—59, and a spindle 60, the arms 53—54 and 56 being in direct engagement with abutments upon their respective shipping rods while the arm 55 engages one end of a rocking lever 61, the other end of which engages abutments upon the shipping rod 38.

The several sleeves 57—58—59 and the spindle 60 are arranged to be operated by any suitable operating means not shown herein, but for an example of a suitable operating means I refer to that shown in a co-pending application Serial Number 585,700 filed October 7th, 1910. In general such a controlling and operating device comprises means whereby movements of rotation may be given to the sleeves and spindle selectively and in the proper direction as follows: first, a rotative movement in one direction to the sleeve 57 while the sleeves 58—59 and the spindle 60 remain idle which will cause an operation of the high speed clutch 26—28 whereby to connect the parts in high speed or direct driving relation; second, a rotative movement in the opposite direction to the said sleeve 57 and simultaneously therewith a movement in the same direction to the sleeve 58, which will simultaneously operate the clutch 27—29 upon the driven shaft and the clutch 30—31 upon the intermediate shaft thereby resulting in an intermediate forward driving relation; third, a rotative movement in the direction last described to the sleeve 57 and simultaneously a rotative movement in the same direction to the sleeve 59; this will result in the simultaneous operation of the clutch 27—29 upon the driven shaft, and of the clutch 32—33 upon the intermediate shaft (the shipper rod 38 moving in the required direction because of the rocking lever 61 which reverses the movement thereof with respect to the operating arm 55), whereby low speed driving movements are effected; and fourth, a rotative movement in the same direction as that last mentioned to the sleeve 57, simultaneously with a movement in the same direction to the spindle 60, whereby the clutch 27—29 upon the driven shaft is operated simultaneously with the reversing clutch 34—35, to effect driving movements in a reverse direction.

In order to hold the various shipping rods in their neutral or dead positions to prevent them from being accidentally shifted from such neutral or dead positions as a result of jars or other causes, and to facilitate the returning of the various shipper rods to their dead positions, I have provided impositive locking means comprising a spring-pressed stud 62 for each said shipper rod, each stud being arranged in a suitable housing 63 secured to the casing 12 and provided with a rounded head 64 for engaging a notch 65 in the shipper rod. A suitable helical spring is contained within the casing around the stem of the stud to force the same toward the shipper rod. This construction is shown more fully in the detail Figs. 5 and 7. The spring pressure tends to hold the studs in engagement with the notches in the shipper rods until they are forced out of such engagement by the positive longitudinal movements imparted to the shipper rods by means of the operating mechanism, the rounded heads of the studs permitting the studs to be forced rearward and so to release their engagement with the notches when the shipper rods are thus positively operated.

In the foregoing description of the operation of the clutch means it will be observed that the shipping rod 36 is operated whenever any driving connection is required. When moved in one direction alone it connects the gearing in high speed relation, but when moved in the other direction one of the other shipping rods is coupled therewith so as to effect a driving relation at an intermediate speed, a low speed, or in a reverse direction. It will also be seen that only one other shipping rod is ever operated at the same time as the shipping rod 36 is operated, and it is of course extremely undesirable that any but the one shipping rod be moved because if any other were moved at such time it would probably result in a locking of the gearing or a breaking of the parts. To prevent any but one of the shipping rods 37—38—39 from being operated at the same time as the shipping rod 36, I have provided locking means comprising two rocking arms 66—67, each being independently mounted upon a stationary stud or pivot carried by the casing 12. The arm 66 has a portion at one end disposed in line with the yielding stud of the shipper rod 39, and a portion at the other end in line with the two studs of the shipper rods 37 and 38, while the rocking arm 67 has its opposite extremities respectively in line with the studs of the latter two said shipper rods 37—38. When any one of the shipper rods 37—38—39 is operated, the arms 66—67 may rock freely upon their pivotal supports, because there is a sufficient clearance to permit such movements but when any one of these shipper rods is operated and either or both of the said levers is so rocked upon its or their supports, the end thereof opposite to that lifted will bear upon the ends of the studs of the other shipper rods so as to positively lock them against movement. For instance, if the shipper rod 39 is operated the end of the rocker arm 66 adjacent to the stud of the said shipper rod 39 will be lifted, and the opposite end thereof thereby depressed into engagement with the ends of the studs of the shipper rods 37—38.

Thus after the shipper rod 39 has once been operated and until it is again moved to its neutral inoperative position, it will not be possible to move either of the shipper rods 37 or 38 because the impositive locking studs 62 thereof will, at such time, be held down by the rocking lever 66 so that they at such time become positive locking means. Similarly, if either the shipping rod 37 or 38 is operated the stud in respective engagement therewith will reverse the position of the rocking arm 66 just above referred to, so as to lock the stud of the shipper rod 39, and will at the same time so rock the arm 67 about its support as to cause a locking of the stud of that of the two shipper rods 37—38 which is not being operated at the time. The result of the foregoing is that while the shipper rod 36 may be freely operated at all times and any one of the shipper rods 37—38—39 may be operated in combination therewith, only one of such shipping rods can be operated therewith at a time, both of the others during such time of operation being absolutely locked against movement.

In addition to the foregoing impositive and positive locking means for the shipper rods I also preferably provide another locking means by which the clutch operating mechanism is normally locked in its neutral and operated positions, means being provided for unlocking it at such times as it is to be operated. This means is shown herein because it forms a part of the complete gearing, but it is not claimed *per se* in this application because it forms a part of the subject matter of a co-pending application filed February 24, 1910. Serial Number 545,565. Mounted transversely in the top of the casing 12 is a rock shaft 68 upon which are secured four quadrants 69, each of which is provided with two concentrically disposed laterally extending walls 70—70. Each of the operating arms 53—54—55—56 is provided with a locking arm 71 which carries at the end thereof a stud or roller 72. This stud 72 is arranged to be received between or upon either side of the said walls 70—70, being received between the walls 70—70 when its shipper rod is in a neutral position, being received on the inside of the inner wall 70 when the shipper rod is moved in one direction, and being received upon the outside of the outer wall 70 when the shipper rod is moved in the other direction. An operating arm 73 and a connecting link 74 connects the said rock shaft 68 with a suitable operating means such as a lever or pedal. The locking means is shown in its normal rest position in the drawings (see particularly Fig. 6). By moving the link 74 in the direction of the arrow in Fig. 6 the studs 72 upon the several arms 71 are released, thereby permitting the clutch mechanism to be operated. Directly the operating mechanism has been moved to its final position the link 74 may be caused to move back to its former position thereby causing the locking quadrants 69 to engage the several studs 72 in whatever positions they may be at the time, and to lock them in such positions until they are again released by another movement of the link 74 in the direction of the arrow shown. The advantage of such a locking mechanism will be readily understood when it is realized that the operating means may be moved to its final position and so locked before the clutches have completed their movements, the completion of the movements thereof taking place under the action of the springs 45—49. The function of this locking mechanism differs, it will be noticed, from that of the locking mechanism included in the rocking arm 66—67 because the former locking mechanism positively locks the operating means for all the clutches whenever they are not being operated, but leaves them free to be operated when so desired, while the latter locks the operating means for certain of the clutches during the time other selected clutches are being operated.

What I claim is:

1. In transmission and reversing gearing, a main clutch including a shiftable element, additional clutches including shiftable elements, means for operating the main clutch element alone or in conjunction with any one of the additional clutch elements, and means for locking all the shiftable elements of the additional clutches when the main clutch element is shifted alone, and for locking the remaining shiftable elements when one of the additional clutch elements is shifted to act in conjunction with the main clutch element, substantially as and for the purpose described.

2. In transmission and reversing gearing, a main clutch including a shiftable element, additional clutches including shiftable elements, means for operating the main clutch element alone or in conjunction with any one of the additional clutch elements, and means for locking all the shiftable elements of the additional clutches when the main clutch element is operated alone, and for locking the remaining shiftable elements when one of the additional clutch elements is acting in conjunction with the main clutch element, the locking means including impositive locking parts paired respectively with the shiftable elements of the additional clutches and operable by the shifting movement of such elements, and a member common to all of said parts and arranged to be operated by any one of said parts when moving out of operative position to positively hold the other locking parts from operation, substantially as and for the purpose specified.

3. In transmission gearing, shiftable elements, impositive locking means for normally holding said elements from shifting, and means arranged to be operated by the impositive locking means of one shiftable element to positively hold the normally impositive means of the other elements from positive means when said one shiftable element is shifted, substantially as and for the purpose set forth.

4. In transmission gearing, two shiftable members, impositive means for normally locking said members from movement, said means including parts movable out of operative position by the shifting of said members, and a rocking member pivoted between said parts and acting on opposite sides of its pivot with said parts whereby when either part is operated out of operative position, the other part is positively held in operative position, substantially as and for the purpose described.

5. In transmission gearing, driving and driven shafts, an intermediate shaft, a reverse shaft, a train of gearing between the driving, the intermediate and the reverse shafts, the gearing being arranged to drive the reverse shaft through the intermediate shaft, gears loosely mounted on the driven, intermediate and the reverse shafts, the loose gears being arranged to transmit motion to the driven shaft directly from the intermediate shaft and directly from the reverse shaft, and means for connecting the loose gears to their respective shafts, substantially as and for the purpose specified.

6. In transmission gearing, the combination of driving and driven shafts arranged in axial alinement, an intermediate shaft and a reverse shaft extending parallel to the driving and driven shafts, a train of gearing including gears fixed on the driving, intermediate and reverse shafts and arranged so that the reverse shaft is driven from the intermediate shaft, gears loosely mounted on the driven, intermediate and reverse shafts, the gears on the intermediate and reverse shafts meshing with loose gears on the driven shaft, a main clutch element shiftable from a neutral position in one direction to connect the driving and driven shafts directly together, and in the opposite direction from its neutral position to clutch the loose gears on the driven shaft to said driven shaft, additional clutch elements operable to connect any one of the loose gears on the intermediate and reverse shafts to said shafts respectively, and means for operating the clutch elements, substantially as and for the purpose set forth.

7. In transmission gearing, driving and driven shafts arranged in axial alinement, intermediate and reverse shafts arranged parallel to the driving and driven shafts, a train of gearing including gears fixed on the driving, the intermediate and the reverse shafts, the gearing being arranged to drive the reverse shaft through the intermediate shaft, a pair of gears of different diameters on the driven shaft, a complementary pair of gears loosely mounted on the intermediate shaft and meshing with the gears loosely mounted on the driven shaft, a gear loosely mounted on the reverse shaft and meshing with one of the loosely mounted gears on the driven shaft, a main clutch element shiftable to connect the driving and driven shafts directly together or to connect the gears on the driven shaft to the driven shaft, clutches associated with the intermediate shaft between the gears loosely mounted on the intermediate shaft, the last mentioned clutches including shiftable elements operable to connect any one of the loose gears on the intermediate shaft to such shaft, a clutch on the reverse shaft including a shiftable element operable to connect the loose gear on the reverse shaft to the same, and means for shifting said clutch elements, substantially as and for the purpose described.

8. In transmission gearing, the combination with driving and driven shafts axially in line with each other, and intermediate and reversing shafts arranged parallel with each other and with the said driving and driven shafts, intermeshing gear wheels mounted fast upon the driving, intermediate and reversing shafts whereby the intermediate shaft is driven by the driving shaft in the opposite direction, and the reversing shaft is driven in the same direction as the driving shaft, two gear wheels of different diameters secured to rotate together and mounted loosely upon the driven shaft, two complementary gear wheels loosely mounted upon the intermediate shaft and arranged in intermeshing relation with the two said loose gear wheels upon the driven shaft, and a gear wheel loosely mounted upon the reversing shaft, and in intermeshing relation with one of the said loosely mounted gear wheels upon the driven shaft, of a sliding collar mounted upon the driven shaft to rotate therewith and provided with two clutch elements, complementary clutch elements, the one carried by the two loosely mounted gear wheels upon the driven shaft and the other carried by a portion secured to the driving shaft, two sets of complementary clutch elements for securing the loosely mounted gear wheels upon the intermediate shaft, respectively therewith, a set of complementary clutch elements for connecting the loosely mounted gear wheels upon the reversing shaft, therewith, and means operating the clutch elements, substantially as and for the purpose specified.

9. In transmission gearing, the combination with driving and driven shafts axially in line with each other, and intermediate and reversing shafts arranged parallel with each other and with the said driving and driven shafts, intermeshing gear wheels mounted fast upon the driving, intermediate, and reversing shafts whereby the intermediate shaft is driven by the driving shaft in the opposite direction and the reversing shaft is driven in the same direction as the driving shaft, two gear wheels of different diameters secured to rotate together and mounted loosely upon the driven shaft, two complementary gear wheels loosely mounted upon the intermediate shaft and arranged in intermeshing relation with the two said loose gear wheels upon the driven shaft, and a gear wheel loosely mounted upon the reversing shaft and in intermeshing relation with one of the said loosely mounted gear wheels upon the driven shaft, of a sliding collar mounted upon the driven shaft to rotate therewith and provided with two clutch elements, complementary clutch elements the one carried by the two loosely mounted gear wheels upon the driven shaft and the other carried by a portion secured to the driving shaft, two sets of complementary clutch elements for securing the loosely mounted gear wheels upon the intermediate shaft, respectively therewith, a set of complementary clutch elements for connecting the loosely mounted gear wheels upon the reversing shaft therewith, and a set of clutch operating members for respectively operating the three sets of clutch elements upon the intermediate and reversing shafts and for sliding the collar upon the driven shaft in either direction for co-action with either of the sets of complementary clutch elements carried by the driving shaft and the loose gear wheels upon the driven shaft respectively.

10. In transmission gearing, the combination with driving and driven shafts axially in line with each other, and intermediate and reversing shafts arranged parallel with each other and with the said driving and driven shafts, intermeshing gear wheels mounted fast upon the driving, intermediate, and reversing shafts whereby the intermediate shaft is driven by the driving shaft in the opposite direction and the reversing shaft is driven in the same direction as the driving shaft, two gear wheels of different diameters secured together but loosely mounted upon the driven shaft, two complementary gear wheels loosely mounted in sliding relation upon the intermediate shaft, and intermeshing with the two said loose gear wheels upon the driven shaft, and a gear wheel loosely mounted in sliding relation upon the reversing shaft, and in intermeshing relation with one of the said loosely mounted gear wheels upon the driven shaft, of a sliding collar mounted upon the driven shaft to rotate therewith and provided with two clutch elements, complementary clutch elements, the one carried by the two loosely mounted gear wheels upon the driven shaft and the other carried by a portion secured to the driving shaft, two clutch members secured fast upon the intermediate shaft, complementary clutch members carried by the two loosely mounted gear wheels upon the said intermediate shaft, a clutch member secured fast upon the reversing shaft, a complementary clutch member carried by the loosely mounted gear wheel upon the said reversing shaft, and four clutch operating members connected respectively with the loosely mounted gear wheels upon the intermediate shaft and the reversing shaft and with the sliding collar upon the driven shaft, for sliding the said gears and collar longitudinally upon their shafts into and out of engagement with the complementary clutch members with which they are adapted to engage.

11. In transmission gearing, the combination with driving and driven shafts axially in line with each other, and intermediate and reversing shafts arranged parallel with each other and with the said driving and driven shafts, intermeshing gear wheels mounted fast upon the driving, intermediate, and reversing shafts whereby the intermediate shaft is driven by the driving shaft in the opposite direction and the reversing shaft is driven in the same direction as the driving shaft, two gear wheels of different diameters secured to rotate together and mounted loosely upon the driven shaft, two complementary gear wheels loosely mounted upon the intermediate shaft and arranged in intermeshing relation with the two said loose gear wheels upon the driven shaft, and a gear wheel loosely mounted upon the reversing shaft and in intermeshing relation with one of the said loosely mounted gear wheels upon the driven shaft, of a sliding collar mounted upon the driven shaft to rotate therewith and provided with two clutch elements, complementary clutch elements the one carried by the two loosely mounted gear wheels upon the driven shaft and the other carried by a portion secured to the driving shaft, two sets of complementary clutch elements for securing the loosely mounted gear wheels upon the intermediate shaft, respectively therewith, a set of complementary clutch elements for connecting the loosely mounted gear wheels upon the reversing shaft, therewith, four clutch operating members one for the sliding collar and the others for the three sets of clutch elements upon the intermediate and reversing shafts, and interlocking mechanism operated by and upon the operation of any one of the three said sets of clutch mechanisms for locking the other two of the said sets of clutch mechanisms while the one of the said sets of clutch mechanisms is being operated and until it is again returned to its neutral inoperative position.

12. In transmission gearing, the combination with driving and driven shafts axially in line with each other, and intermediate and reversing shafts arranged parallel with each other and with the said driving and driven shafts, intermeshing gear wheels mounted fast upon the driving, intermediate, and reversing shafts whereby the intermediate shaft is driven by the driving shaft in the opposite direction and the reversing shaft is driven in the same direction as the driving shaft, two gear wheels of different diameters secured together but loosely mounted upon the driven shaft, two complementary gear wheels loosely mounted in sliding relation upon the intermediate shaft, and intermeshing with the two said loose gear wheels upon the driven shaft, and a gear wheel loosely mounted in sliding relation upon the reversing shaft, and in intermeshing relation with one of the said loosely mounted gear wheels upon the driven shaft, of a sliding collar mounted upon the driven shaft to rotate therewith and provided with two clutch elements, complementary clutch elements, the one carried by the two loosely mounted gear wheels upon the driven shaft and the other carried by a portion secured to the driving shaft, two clutch members secured fast upon the intermediate shaft, complementary clutch members carried by the two loosely mounted gear wheels upon the said intermediate shaft, a clutch member secured fast upon the reversing shaft, a complementary clutch member carried by the loosely mounted gear wheel upon the said reversing shaft, four clutch operating members one for the sliding collar and the others for the three sets of clutch elements upon the intermediate and reversing shafts, and interlocking mechanism operated by and upon the operation of any one of the three said sets of clutch mechanisms for locking the other two of the said sets of clutch mechanisms while the one of the said sets of clutch mechanisms is being operated and until it is again returned to its neutral inoperative position.

13. In transmission gearing, the combination with driving and driven shafts axially in line with each other, and intermediate and reversing shafts arranged parallel with each other and with the said driving and driven shafts, intermeshing gear wheels mounted fast upon the driving, intermediate, and reversing shafts whereby the intermediate shaft is driven by the driving shaft in the opposite direction and the reversing shaft is driven in the same direction as the driving shaft, two gear wheels of different diameters, secured to rotate together and mounted loosely upon the driven shaft, two complementary gear wheels loosely mounted upon the intermediate shaft and arranged in intermeshing relation with the two said loose gear wheels upon the driven shaft, and a gear wheel loosely mounted upon the reversing shaft and in intermeshing relation with one of the said loosely mounted gear wheels upon the driven shaft, of a sliding collar mounted upon the driven shaft to rotate therewith and provided with two clutch elements, complementary clutch elements, the one carried by the two loosely mounted gear wheels upon the driven shaft and the other carried by a portion secured to the driving shaft, two sets of complementary clutch elements for securing the loosely mounted gear wheels upon the intermediate shaft, respectively therewith, a set of complementary clutch elements for connecting the loosely mounted gear wheels upon the reversing shaft, therewith, four clutch operating members including individual shipper rods, one for the sliding collar and the others for the three sets of clutch elements upon the intermediate and reversing shafts, and interlocking mechanism operated by and upon the first portion of the movement of any one of the shipper rods of the said three sets of clutch mechanisms, during a clutch operating movement thereof, for locking the other two shipping rods during the remainder of the movement of the one said shipper rod and until it has again returned to its neutral inoperative position.

14. In transmission gearing, the combination with driving and driven shafts axially in line with each other, and intermediate and reversing shafts arranged parallel with each other and with the said driving and driven shafts, intermeshing gear wheels mounted fast upon the driving, intermediate, and reversing shafts whereby the intermediate shaft is driven by the driving shaft in the opposite direction and the reversing shaft is driven in the same direction as the driving shaft, two gear wheels of different diameters secured together but loosely mounted upon the driven shaft, two complementary gear wheels loosely mounted in sliding relation upon the intermediate shaft, and intermeshing with the two said loose gear wheels upon the driven shaft, and a gear wheel loosely mounted in sliding relation upon the reversing shaft, and in intermeshing relation with one of the said loosely mounted gear wheels upon the driven shaft, of a sliding collar mounted upon the driven shaft to rotate therewith and provided with two clutch elements, complementary clutch elements, the one carried by the two loosely mounted gear wheels upon the driven shaft and the other carried by a portion secured to the driving shaft, two clutch members secured fast upon the intermediate shaft, complementary clutch members carried by the two loosely mounted gear wheels upon the said intermediate shaft, a clutch member secured fast upon the reversing shaft, a complementary clutch member carried by the loosely mounted gear wheel upon the said reversing shaft, four clutch operating members including individual shipper rods, one for the sliding collar and the others for the three sets of clutch elements upon the intermediate and reversing shafts, and interlocking mechanism operated by and upon the first portion of the movement of any one of the shipper rods of the said three sets of clutch mechanisms, during a clutch operating movement thereof, for locking the other two shipping rods during the remainder of the movement of the one said shipper rod and until it has again returned to its neutral inoperative position.

15. In transmission gearing, the combination with driving and driven shafts axially in line with each other, and intermediate and reversing shafts arranged parallel with each other and with the said driving and driven shafts, intermeshing gear wheels mounted fast upon the driving, intermediate, and reversing shafts whereby the intermediate shaft is driven by the driving shaft in the opposite direction and the reversing shaft is driven in the same direction as the driving shaft, two gear wheels of different diameters secured to rotate together and mounted loosely upon the driven shaft, two complementary gear wheels loosely mounted upon the intermediate shaft and arranged in intermeshing relation with the two said loose gear wheels upon the driven shaft, and a gear wheel loosely mounted upon the reversing shaft and in intermeshing relation with one of the said loosely mounted gear wheels upon the driven shaft, of a sliding collar mounted upon the driven shaft to rotate therewith and provided with two clutch elements, complementary clutch elements the one carried by the two loosely mounted gear wheels upon the driven shaft and the other carried by a portion secured to the driving shaft, two sets of complementary clutch elements for securing the loosely mounted gear wheels upon the intermediate shaft, respectively therewith, a set of complementary clutch elements for connecting the loosely mounted gear wheels upon the reversing shaft, therewith, four clutch operating members including individual shipper rods one for the sliding collar and the others for the three sets of clutch elements upon the intermediate and reversing shafts, impositive locking means for the said shipper rods, and interlocking mechanism operated by and upon the first portion of the movement of any one of the shipper rods of the said three sets of clutch mechanisms, during a clutch operating movement thereof, for engaging the impositive locking means of the other two shipping rods to lock the same positively during the remainder of the movement of the one said shipper rod and until it has again returned to its neutral inoperative position.

16. In transmission gearing, the combination with driving and driven shafts axially in line with each other, and intermediate and reversing shafts arranged parallel with each other and with the said driving and driven shafts, intermeshing gear wheels mounted fast upon the driving, intermediate, and reversing shafts whereby the intermediate shaft is driven by the driving shaft in the opposite direction and the reversing shaft is driven in the same direction as the driving shaft, two gear wheels of different diameters secured together but loosely mounted upon the driven shaft, two complementary gear wheels loosely mounted in sliding relation upon the intermediate shaft, and intermeshing with the two said loose gear wheels upon the driven shaft, and a gear wheel loosely mounted in sliding relation upon the reversing shaft, and in intermeshing relation with one of the said loosely mounted gear wheels upon the driven shaft, of a sliding collar mounted upon the driven shaft to rotate therewith and provided with two clutch elements, complementary clutch elements, the one carried by the two loosely mounted gear wheels upon the driven shaft and the other carried by a portion secured to the driving shaft, two clutch members secured fast upon the intermediate shaft, complementary clutch members carried by the two loosely mounted gear wheels upon the said intermediate shaft, a clutch member secured fast upon the reversing shaft, a complementary clutch member carried by the loosely mounted gear wheel upon the said reversing shaft, four clutch operating members including individual shipper rods one for the sliding collar and the others for the three sets of clutch elements upon the intermediate and reversing shafts, impositive locking means for the said shipper rods, and interlocking mechanism operated by and upon the first portion of the movement of any one of the shipper rods of the said three sets of clutch mechanism, during a clutch operating movement thereof, for engaging the impositive locking means of the other two shipper rods to lock the same positively during the remainder of the movement of the one said shipper rod and until it has again returned to its neutral inoperative position.

17. In transmission gearing, the combination with a plurality of parallel shafts including driving and driven shafts, and intermeshing gear wheels having different ratios mounted upon the said shafts, of a plurality of clutches upon the several shafts for selectively connecting certain of the said gear wheels with their respective shafts whereby to vary the speed and direction of the driving relation between the said driving and driven shafts, operating means for the clutches, and interlocking means operated by and upon the first portion of the movement of any one of a group of the said clutches during an operating movement thereof for locking the other clutches of the group against movement during the remaining portion of the movement of the said operating clutch, and until the said clutch has returned to its neutral inoperative position.

18. In transmission gearing, the combination with a plurality of parallel shafts including driving and driven shafts, and intermeshing gear wheels having different ratios mounted upon the said shafts, of a plurality of clutches upon the several shafts for selectively connecting certain of the said gear wheels with their respective shafts whereby to vary the speed and direction of the driving relation between the said driving and driven shafts, operating means for the clutches including shipper rods, and interlocking mechanism operated by and upon the first portion of the movement of any one of the shipping rods of a group of the said clutches, during a clutch operating movement thereof, for locking the other shipping rods of the group against movement during the remaining portion of the movement of the shipping rod of the clutch being operated at the time and until the said shipping rod has returned to its neutral inoperative position.

19. In transmission gearing, the combination with a plurality of parallel shafts including driving and driven shafts and intermeshing gear wheels having different ratios mounted upon the said shafts, of a plurality of clutches upon the several shafts for selectively connecting certain of the said gear wheels with their respective shafts whereby to vary the speed and direction of the driving relation between the said and driven shafts, operating means for the clutches including individual shipper rods, impositive locking means for the said shipper rods, and interlocking mechanism operated by and upon the first portion of the movement of any one of the shipping rods of a group of the said clutches, during a clutch operating movement thereof, for engaging the impositive locking means of the shipping rods of the group to lock the same positively during the remaining portion of the movement of the one shipping rod and until it has again returned to its neutral inoperative position.

20. In transmission gearing, the combination with driving and driven shafts axially in line with each other, and intermediate and reversing shafts arranged parallel with each other and with the said driving and driven shafts, intermeshing gear wheels mounted fast upon the driving, intermediate, and reversing shafts whereby the intermediate shaft is driven by the driving shaft in the opposite direction and the reversing shaft is driven in the same direction as the driving shaft, two gear wheels of different diameters secured to rotate together and mounted loosely upon the driven shaft, two complementary gear wheels loosely mounted upon the intermediate shaft and arranged in intermeshing relation with the two said loose gear wheels upon the driven shaft, and a gear wheel loosely mounted upon the reversing shaft and in intermeshing relation with one of the said loosely mounted gear wheels upon the driven shaft, of a sliding collar mounted upon the driven shaft to rotate therewith and provided with two clutch elements, complementary clutch elements the one carried by the two loosely mounted gear wheels upon the driven shaft and the other carried by a portion secured to the driving shaft, two sets of complementary clutch elements for securing the loosely mounted gear wheels upon the intermediate shaft, respectively therewith, a set of complementary clutch elements for connecting the loosely mounted gear wheels upon the reversing shaft, therewith, and operating means for the said clutch elements including four shipping rods one connected with the said sliding collar and the others connected with the three sets of clutches upon the intermediate and reversing shafts respectively, operating arms, certain of which connect directly with the said shipping rods to operate them, and a rocking lever between one of the said operating arms and one of the said shipping rods whereby the movement of the last said shipping rod will be reversed with respect to the movement of the operating arm therefor.

21. In transmission gearing, the combination with driving and driven shafts arranged axially in line with each other, intermediate and reversing shafts arranged beneath the same parallel with each other and with the said driving and driven shafts, and intermeshing gear wheels having different ratios upon the said shafts, of a plurality of clutches upon the several shafts for selectively connecting certain of the said gear wheels with their respective shafts whereby to vary the speed and direction of the driving relation between the said driving and driven shafts, the said clutches including a longitudinally slidable portion mounted upon the driven shaft, two independent longitudinally slidable portions upon the intermediate shaft, and a longitudinally slidable portion upon the reversing shaft, four shipper rods disposed two upon each side of the axis of rotation of the driving and driven shafts, all of them being in the horizontal plane containing the axis of the said shafts and arranged to slide longitudinally parallel with the said axis, a horizontal connecting element arranged to connect one of the shipper rods with the longitudinally slidable clutch portion upon the driven shaft, three oblique connecting elements for independently connecting the other shipper rods with the longitudinally slidable clutch portions upon the intermediate and reversing shafts, and means for imparting independent longitudinal movements to the said shipper rods to operate the clutches.

22. In transmission gearing, the combination with driving and driven shafts arranged axially in line with each other, intermediate and reversing shafts arranged beneath the same parallel with each other and with the said driving and driven shafts, and intermeshing gear wheels having different ratios upon the said shafts, of a plurality of clutches upon the several shafts for selectively connecting certain of the said gear wheels with their respective shafts whereby to vary the speed and direction of the driving relation between the said driving and driven shafts, the said clutches including a longitudinally slidable portion mounted upon the driven shaft, two independent longitudinally slidable portions upon the intermediate shaft, and a longitudinally slidable portion upon the reversing shaft, four shipper rods disposed two upon each side of the axis of rotation of the driving and driven shafts, all of them being in the horizontal plane containing the axis of the said shafts and arranged to slide longitudinally parallel with the said axis, a horizontal connecting element arranged to connect one of the shipper rods with the longitudinally slidable clutch portion upon the driven shaft, three oblique connecting elements for independently connecting the other shipper rods with the longitudinally slidable clutch portions upon the intermediate and reversing shafts, a plurality of concentrically arranged operating shafts, operating arms directly connecting the said shafts with three of the said shipper rods, another operating arm, and an intermediate rocking lever between the said operating arm and the other said shipper rod whereby the direction of movement of the shipper rod is reversed with respect to the movement of the operating arm.

CLARK W. PARKER.

Witnesses:
D. HOWARD HAYWOOD,
LYMAN S. ANDREWS, Jr.